US012204810B2

(12) United States Patent
Tennøe et al.

(10) Patent No.: US 12,204,810 B2
(45) Date of Patent: Jan. 21, 2025

(54) NATURAL LANGUAGE MARKUP FOR MEETINGS

(71) Applicant: Cisco Technology, Inc., San Jose, CA (US)

(72) Inventors: Bjørn Solnørdal Tennøe, Oslo (NO); Dušan Jaković, Oppegård (NO); Ole André Bech, Slependen (NO); Qiujun Zhao, Hangzhou (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 99 days.

(21) Appl. No.: 17/954,793

(22) Filed: Sep. 28, 2022

(65) Prior Publication Data

US 2024/0103793 A1 Mar. 28, 2024

(51) Int. Cl.
*G06F 3/14* (2006.01)
*G06V 30/224* (2022.01)
*H04L 12/18* (2006.01)
*H04N 7/14* (2006.01)

(52) U.S. Cl.
CPC .......... *G06F 3/1454* (2013.01); *G06V 30/224* (2022.01); *H04L 12/1822* (2013.01); *H04N 7/147* (2013.01)

(58) Field of Classification Search
CPC . G06F 3/1454; G06V 30/224; H04L 12/1822; H04N 7/147
See application file for complete search history.

(56) References Cited

U.S. PATENT DOCUMENTS

| 11,024,328 | B2* | 6/2021 | Jung ................... H04L 12/1813 |
| 11,030,585 | B2* | 6/2021 | Nelson ............... G06Q 10/1095 |
| 11,245,735 | B1 | 2/2022 | Kwatra et al. |
| 11,270,060 | B2* | 3/2022 | Nelson ................... G06N 20/00 |
| 2013/0007123 | A1 | 1/2013 | Crosbie et al. |
| 2018/0146160 | A1 | 5/2018 | Kang et al. |
| 2018/0365657 | A1 | 12/2018 | Kitada et al. |
| 2022/0060659 | A1 | 2/2022 | Pell |
| 2022/0191258 | A1 | 6/2022 | Sharp et al. |

OTHER PUBLICATIONS

Herskowitz, N. Microsoft 365, "Brace yourselves: Hybrid work is hard. Here's how Microsoft Teams and Office 365 can help," Microsoft 365 Blog, https://www.microsoft.com/en-us/microsoft-365/blog/2021/09/09/brace-yourselves-hybrid-work-is-hard-heres-how-microsoft-teams-and-office-365-can-help/, retrieved Aug. 3, 2022, 10 pages.
Alam, N. et al, Technical Disclosure Commons, "Controlling the Distribution of Multiple Streams in a Video Collaboration Environment," https://www.tdcommons.org/dpubs_series/4635, Defensive Publications Series, Oct. 4, 2021, 10 pages.

* cited by examiner

*Primary Examiner* — Doon Y Chow
(74) *Attorney, Agent, or Firm* — Edell, Shapiro & Finnan, LLC

(57) ABSTRACT

A natural language markup for meetings is introduced that facilitates planning and facilitation of online meetings. Shared content is obtained during an online meeting. The shared content is shared by a first participant in the online meeting for display on devices of one or more second participants in the online meeting. A visual object is detected in the shared content and additional content is obtained based on detecting the visual object. The additional content is transmitted with the shared content for display on the devices of the one or more second participants.

20 Claims, 14 Drawing Sheets

1200

```
┌─────────────────────────────────────────────────────────────┐
│ OBTAINING SHARED CONTENT DURING AN ONLINE MEETING, THE SHARED│ ─ 1210
│ CONTENT BEING SHARED BY A FIRST PARTICIPANT IN THE ONLINE    │
│ MEETING FOR DISPLAY ON DEVICES OF ONE OR MORE SECOND         │
│ PARTICIPANTS IN THE ONLINE MEETING                           │
└─────────────────────────────────────────────────────────────┘
                              │
                              ▼
┌─────────────────────────────────────────────────────────────┐
│           DETECTING A VISUAL OBJECT IN THE SHARED CONTENT    │ ─ 1220
└─────────────────────────────────────────────────────────────┘
                              │
                              ▼
┌─────────────────────────────────────────────────────────────┐
│     OBTAINING ADDITIONAL CONTENT BASED ON DETECTING THE      │ ─ 1230
│                      VISUAL OBJECT                           │
└─────────────────────────────────────────────────────────────┘
                              │
                              ▼
┌─────────────────────────────────────────────────────────────┐
│  TRANSMITTING THE ADDITIONAL CONTENT WITH THE SHARED CONTENT │ ─ 1240
│   FOR DISPLAY ON THE DEVICES OF THE ONE OR MORE SECOND       │
│                      PARTICIPANTS                            │
└─────────────────────────────────────────────────────────────┘
```

FIG.12

NATURAL LANGUAGE MARKUP FOR MEETINGS

TECHNICAL FIELD

The present disclosure relates to online video meetings/conferences.

BACKGROUND

When presenting shared content during an online meeting, multiple participants in the online meeting may be responsible for presenting different aspects of the presentation or shared content. Changes to the shared content may occur last minute and it may be difficult to synchronize versions of the shared content. In addition, different participants may prepare content to present using different applications. The technical meeting setups may become the focus of the meeting, potentially derailing the meeting from its intended purpose.

BRIEF DESCRIPTION OF THE DRAWINGS

FIG. 12 is a flow diagram illustrating a method of obtaining and displaying content based on detecting a visual object in content shared by a meeting host or coordinator during an online meeting, according to an example embodiment.

DETAILED DESCRIPTION

Overview

Figure 1:
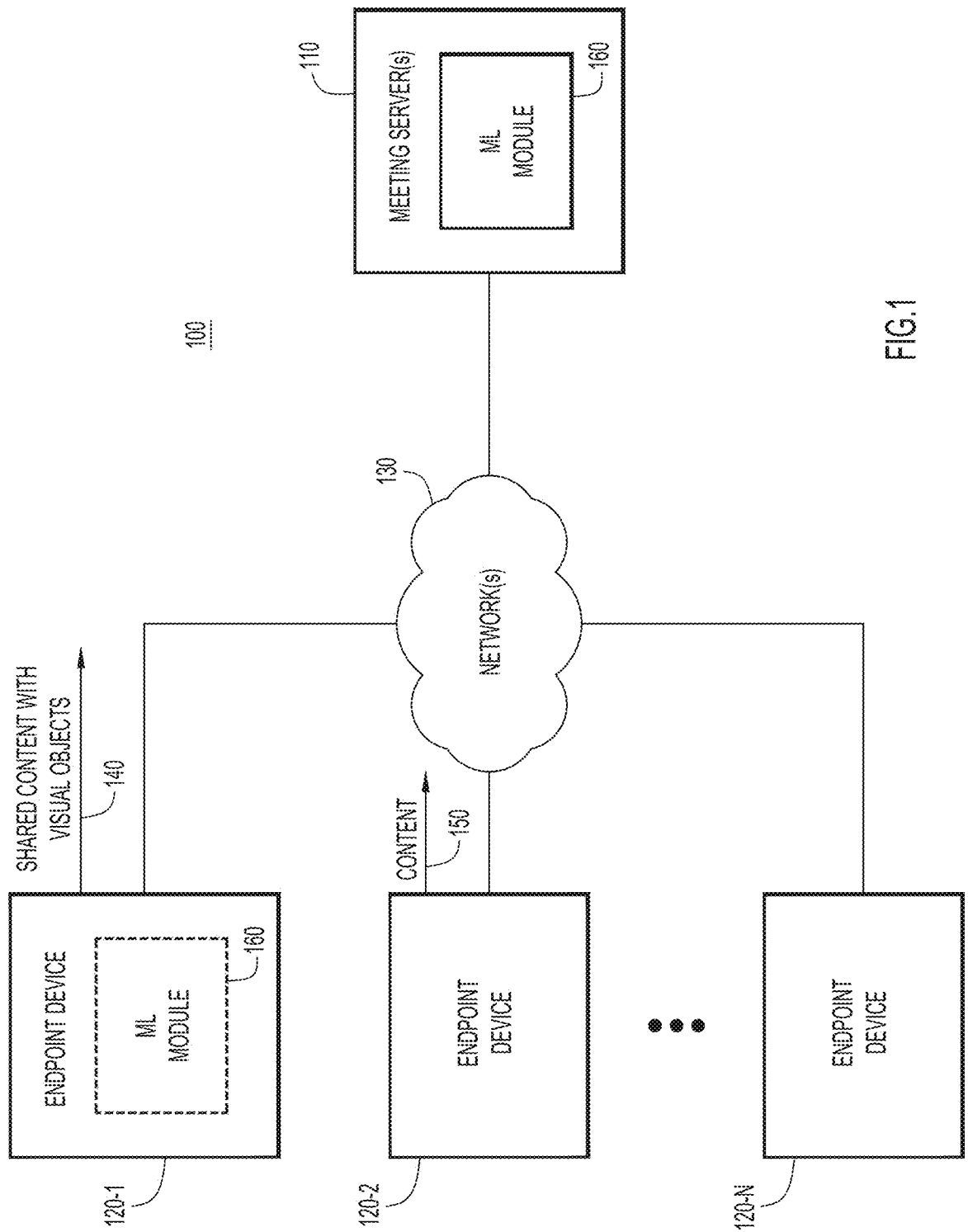
FIG. 1 is a block diagram of an online video conference/meeting system configured to support planning and facilitation of online meetings by introducing a natural language markup, according to an example embodiment.

In one embodiment, a method is provided for improved planning and facilitation of online meetings by introducing a natural language markup for meetings. The method includes obtaining shared content during an online meeting, the shared content being shared by a first participant in the online meeting for display on devices of one or more second participants in the online meeting; detecting a visual object in the shared content; obtaining additional content based on detecting the visual object; and transmitting the additional content with the shared content for display on the devices of the one or more second participants.

Example Embodiments

Online meetings may be used to present material by sharing content from one or more participants' user devices. In some cases, different participants in the online meeting may be responsible for presenting different aspects of the material during the online meeting. Currently, online meeting services/applications do not offer smart actions based on presentation material during online meetings.

Often in team meetings, project updates, company all-hands meetings, and other type of meetings, multiple people in a team may be responsible for presenting different parts of a presentation or discussion. Changes may occur last minute, and it may be hard to synchronize content among different presenters. Tools exist that provide multi-user updates to a document, but these tools only work if all users are sharing content using the same format or application (e.g., PowerPoint). Some contributors may present using slides, other contributors may present using a word processing document, PDF or web page, and some contributors may want to use a whiteboard for their portion of the presentation. Without scripting the online meeting, participants must manually pass the share between themselves. In other words, a first participant shares content for their portion of the presentation and when it is a second participant's turn to present, the first participant stops sharing content and the second participant starts sharing content. The technical meeting setup can become a focus of the meeting, potentially derailing the meeting from its intended purpose.

When different participants are presenting different parts of a presentation, the presenter may be expected to be highlighted, for example by having the presenter's video stream presented on the screen or stage. The highlighted participants may or may not be expected to speak. Currently it is not possible to plan the meeting so that when a certain point is reached in the presentation, a person or a selected group of people will be brought forward or highlighted. In addition, several useful sharing scenarios, such as natively displaying a web page inline in a videoconference or simultaneous sharing of multiple content sources, are unavailable. Additionally, a facilitator or host of a meeting is currently unable to set up an online meeting so that a participant is prompted to share material at a planned point.

In many cases, videoconferences hosted by major enterprises are unaware of the meetings' agendas beyond basic details, such as start time and duration. Therefore, online meeting services/applications do not guide participants through the meetings (e.g. by keeping time during particular segments). As such, the online meeting services/applications fall short of meetings that are hosted by professional, human meeting facilitators.

Embodiments described herein provide for improved planning and facilitation of online meetings by being contextually aware of the content and the participants by introducing a natural language markup for meetings. The markup language consists of text and visual objects/artifacts present in shared content that define actions to be performed during the online meeting. The markup is introduced to presentation material of any file format, and is interpreted by a meeting server or client/device (e.g., using artificial intelligence (AI) processes) in advance or in real time during a meeting.

In particular, embodiments described herein provide for automatically detecting a visual object in shared content and performing one or more actions based on detecting the visual object. An endpoint device and/or a meeting server may include a machine learning (ML) module that analyzes content being shared by a participant of an online meeting and detects predefined visual objects using AI technology. When a visual object is detected, the ML module replaces an area containing the visual object (or a different area on the screen) with second content. The second content may be, for example, live video feed of a participant in the online meeting, a document stored in a cloud service or at a user device, an application, etc. According to some embodiments, when the visual object is detected, the ML module may identify additional information in the content to identify the second content to replace the area containing the visual object. According to other embodiments, the second content is identified based on type of the visual object.

According to embodiments described herein, the natural language markup consists of text and visual artifacts/objects that define actions to be performed in-meeting by an online meeting service. A user device or meeting server interprets the text and visual artifacts/objects in any shared content, regardless of a file format or application type of the shared content. The user device or meeting server performs actions as specified by the markup to facilitate meetings. The actions may include, for example, replacing the visual artifacts/objects with video feed(s) or other shared content (in a same or different file format or application type as the shared content), presenting video feed(s) or other shared content next to the shared content, providing instructions or reminders to participants in the online meetings, dividing content among multiple screens, or performing additional actions.

Reference is first made to FIG. 1. FIG. 1 shows a block diagram of a system 100 that is configured to provide online meeting services using a natural markup language. The system 100 includes one or more meeting server(s) 110 and a plurality of endpoint devices 120-1 to 120-N (sometimes referred to herein individually as endpoint device 120 or collectively as endpoint devices 120) that communicate with meeting server(s) 110 via one or more networks 130. The meeting server(s) 110 are configured to provide an online meeting service for hosting a communication session among endpoint devices 120-1 to 120-N. The meeting server(s) 110 includes a machine learning (ML) module 160 for identifying and interpreting visual objects and/or text in content shared during an online meeting and performing actions based on the visual objects and/or text. In some embodiments, one or more of the endpoint devices 120-1 to 120-N may include a ML module 160, as illustrated by the dashed lines around the ML module 160 in endpoint device 120-1. Although in the example described with respect to FIG. 1, the functions of ML module 160 are performed at meeting server(s) 110, the functions of ML module 160 may be performed at an endpoint device 120-1 to 120-N or a different device not illustrated in FIG. 1.

Each of endpoint devices 120-1 to 120-N may be a tablet, laptop computer, desktop computer, Smartphone, virtual desktop client, virtual whiteboard, or any user device now known or hereinafter developed. Endpoint devices 120-1 to 120-N may have a dedicated physical keyboard or touch-screen capabilities to provide a virtual on-screen keyboard to enter text. Endpoint devices 120-1 to 120-N may also have short-range wireless system connectivity (such as Bluetooth™ wireless system capability, ultrasound communication capability, etc.) to enable local wireless connectivity with a video endpoint device in a meeting room or with other user devices in the same meeting room. Endpoint devices 120-1 to 120-N may store content (e.g., a presentation, a document, images, etc.) for sharing the content with other user devices during an online meeting or communication session. In some embodiments, endpoint devices 120-1 to 120-N may be endpoint devices for facilitating communication with meeting server(s) 110 during the online meeting. Endpoint devices 120-1 to 120-N may additionally connect to user devices (not illustrated in FIG. 1) for sharing content stored on the user devices during the online meeting.

In some cases, endpoint devices 120-1 to 120-N may be videoconference endpoints designed for personal use (e.g., a desk device used by a single user) or for use by multiple users (e.g., a videoconference endpoint in a meeting room). In some embodiments, endpoint devices 120-1 to 120-N may be configured to open content to display or share (e.g., when a digital whiteboard is accessed directly on endpoint device 120).

In the example illustrated in FIG. 1, a user (e.g., a meeting coordinator, host, or co-host) of endpoint device 120-1 may be presenting content and, at 140, endpoint device 120-1 may transmit shared content with visual objects to meeting server(s) 110 via network(s) 130. Meeting server(s) 110 may transmit the shared content to endpoint devices 120-2 to 120-N for display on endpoint devices 120-2 to 120-N. ML module 160 may detect the visual objects in the shared content. For example, ML module 160 may analyze the shared content using AI technology that is trained to recognize the visual objects. The visual objects may include graphics and/or text.

ML module 160 may interpret the graphics and/or text and perform actions based on information associated with the graphic and/or text. For example, a particular graphic may indicate that meeting server(s) 110 is to perform a particular action. As another example, the text may describe the actions that are to be performed. In some cases, a visual object may include a graphic and text. In this example, ML module 160 may detect the graphic and, based on detecting the graphic, identify the text and an action to take based on instructions in the text.

In some embodiments, the action may include transmitting instructions, reminders, or other information to one or more participants in the online meeting. In other embodiments, the action may include replacing a visual object with other content or transmitting the other content for display next to or on top of the shared content. For example, the graphic and/or text may indicate that a visual object in the shared content shared by the user of endpoint device 120-1 is to be replaced with other content, such as content obtained from another endpoint device (e.g., endpoint device 120-2). As another example, the graphic and/or text may indicate that other content is to be placed next to or on top of a portion of the shared content.

As shown at 150, meeting server(s) 110 obtains the content from endpoint device 120-2. Meeting server(s) 110 replaces the visual object with the content obtained from endpoint device 120-2 or places the content obtained from endpoint device 120-2 next to or on top of the shared content from endpoint device 120-1. The content obtained from endpoint device 120-2 may be, for example, a video feed of a user of endpoint device 120-2, shared content (e.g., slides, a word processing document, etc.), content from a webpage, content from another application, or another type of content. In some embodiments, the text may direct the meeting server(s) 110 to instruct a user of endpoint device 120-2 to share content and the content shared by the user of endpoint device 120-2 may displayed with the content shared from endpoint device 120-1 (e.g., the content shared by the user of endpoint device 120-2 may replace the visual objects in the content shared by the user of endpoint device 120-1).

Meeting server(s) 110 performs the action, such as replacing the visual object with the content or displaying the content with the shared content from endpoint device 120-1, and transmits the content shared by endpoint device 120-1 with the content from endpoint device 120-2 to endpoint devices 120-2 to 120-N. Endpoint devices 120-2 to 120-N display the shared content from endpoint device 120-1 with the content from endpoint device 120-2 on the same screen. In some embodiments, endpoint devices 120-2 to 120-N display the shared content from endpoint device 120-1 with the content from endpoint device 120-2 replacing the visual objects in the shared content from endpoint device 120-1. In this scenario, the users of endpoint devices 120-2 to 120-N will not see the visual objects (i.e., the graphics and/or text) and, instead, will see the content from endpoint device 120-2 that replaces the visual objects.

By automatically performing the actions based on identifying and interpreting the visual objects, meetings in which more than one participant is presenting content may run more smoothly. Instead of performing a first share with a first participant and then performing a second share with a second participant, the second participant may seamlessly share content within the content shared by the first participant. In addition, a video feed of one or more presenters may automatically be brought forward when it is time for the one or more presenters to present content. In this way, the focus of the meeting may be on the content presented instead of the mechanics of how the content will be presented.

Figure 2:
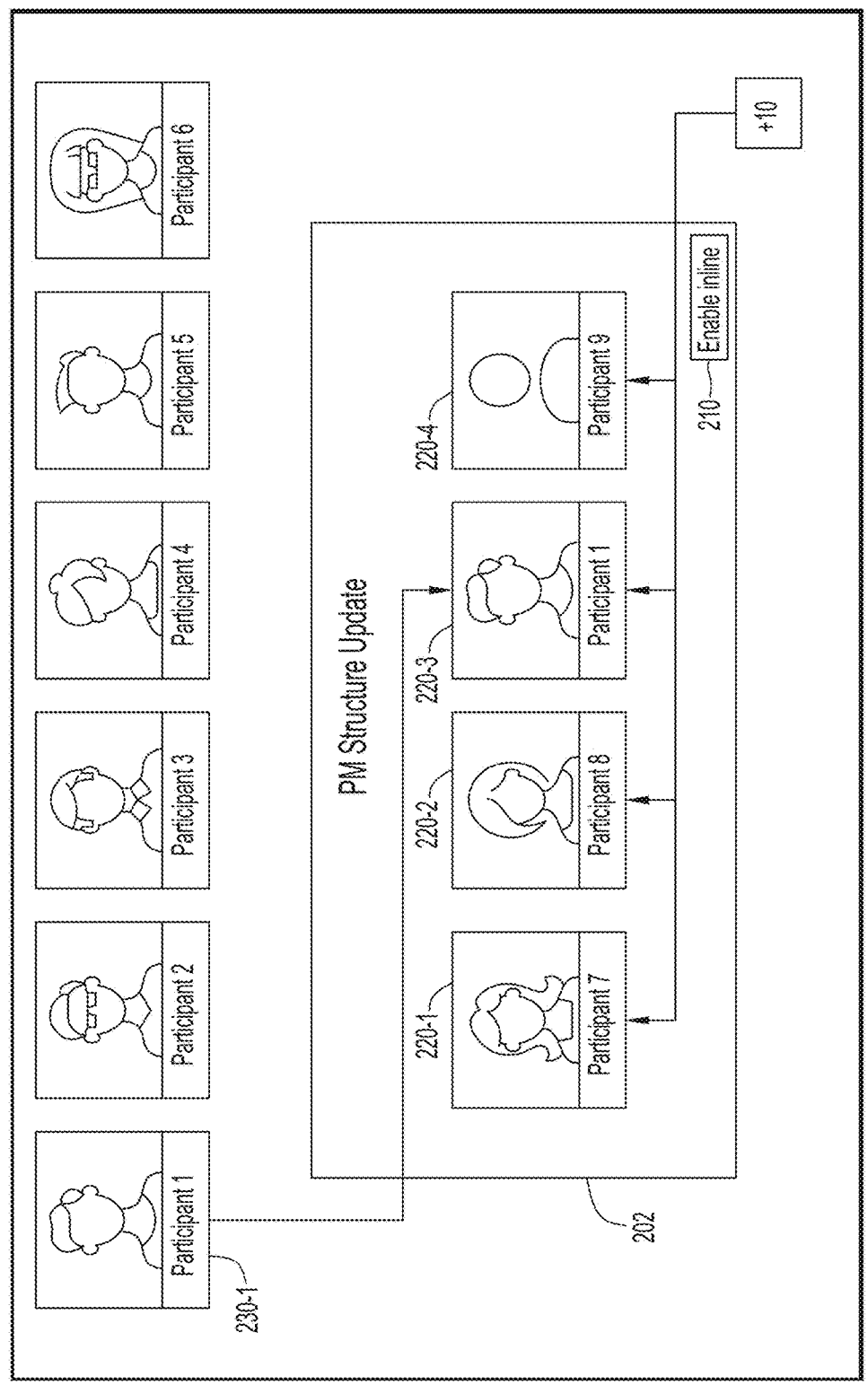
FIG. 2 shows a user interface depicting an example in which visual objects are replaced with video feeds of users in response to detecting graphics and/or text in content shared by a meeting host or coordinator, according to an example embodiment.

Reference is now made to FIG. 2. FIG. 2 illustrates a user interface 200 depicting an example in which visual objects are replaced with video feeds of users in response to detecting graphics and/or text in content shared by a host of an online meeting.

In the example illustrated in FIG. 2, a coordinator or host of an online meeting may share content including shared content 202. Shared content 202 includes images 220-1, 220-2, and 220-3 that correspond to participants participating in the online meeting and an avatar icon 220-4 that includes a name of a user (e.g., Participant 9) who is participating in the online meeting. Images 220-1 to 220-3 may be, for example, photographic images of the participants. Shared content 202 additionally includes text 210. In this example, the text reads "Enable Inline." The inclusion of the predefined command in text 210 (e.g., "Enable Inline") triggers an AI interpretation of the shared content. In this example, ML module 160 (which is located at meeting server(s) 110, endpoint devices 120, etc.) may identify the text 210 that reads "Enable Inline" as a predefined command to overlay the images 220-1 to 220-3 and the avatar icons 220-4 with live video feeds of the corresponding participants. In other examples, different text may correspond to different actions.

In the example illustrated in FIG. 2, ML module 160 may use, for example, facial recognition technology to match an image 220-1 to 220-3 with a video feed of a corresponding participant. In some embodiments, ML module 160 may match an image 220-1 to 220-3 or an avatar icon 220-4 with a corresponding video feed based on a name associated with the image 220-1 to 220-3 or the avatar icon 220-4. For example, ML module 160 may identify the video feed corresponding to the avatar icon 220-4 by identifying the video feed that corresponds to "Participant 9." ML module may replace the images 220-1 to 220-3 and the avatar icon 220-4 with the corresponding video feeds. For example, image 220-3 may be replaced with video feed 230-1.

By replacing the images and/or avatar icons with the video feeds of the corresponding participants in the online meeting, participants presenting particular content may be brought forward to present the content. In addition, when new shared content is presented, the participants are automatically removed from the shared content. In this way, particular users may be easily highlighted for presenting certain content.

Figure 3:
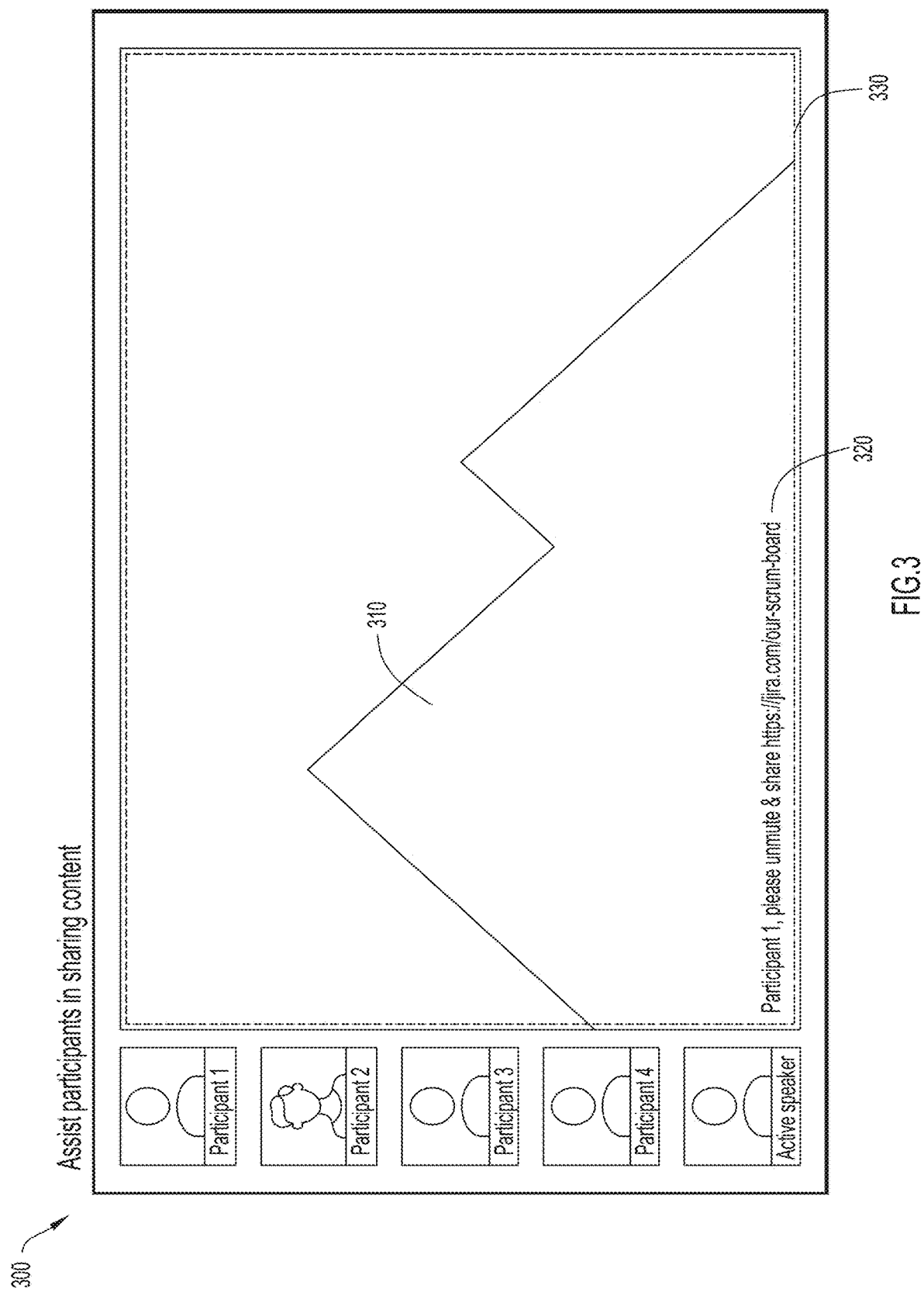
FIG. 3 shows a user interface depicting an example in which a visual object is replaced with shared content in response to detecting graphics and/or text in content shared by a meeting host or coordinator, according to an example embodiment.

Reference is now made to FIG. 3. FIG. 3 illustrates a user interface 300 depicting an example in which a visual object is replaced with shared content in response to detecting graphics and/or text in content shared by a meeting host.

In the example illustrated in FIG. 3, a coordinator or a host of an online meeting shares content that includes an icon 310, such as a mountain icon, and text 320. Although a mountain icon is depicted in FIG. 3, any icon may be used at a placeholder for shared content. In addition, in some embodiments, different icons may represent different actions to perform. In this example, the ML module 160 may identify the icon 310 as a placeholder for a shared content. In other words, in this example, the mountain icon may be a predefined icon indicating that shared content is to be obtained from a participant in the online meeting and used to replace the area around the mountain icon. In some embodiments, in response to detecting the mountain icon, ML module 160 may identify text in the content shared by the meeting host or coordinator (i.e., the main shared content) to determine where or how to obtain the shared content to replace the mountain icon.

In response to detecting the icon 310, ML module 160 may identify and parse the text 320. In the example illustrated in FIG. 2, text 320 says "Participant 1, please unmute & share https://jira.com/our-scrum-board." By parsing text 320, ML module 160 may transmit a message to a participant in the online meeting (e.g., Participant 1) requesting that the participant who is next to share content unmute his or her microphone and share content (e.g., a slide, a web page, a word processing document, etc.). In this example, the participant is requested to share a URL and, if the participant acknowledges or selects an option to accept the instructions, the participant's default web browser may automatically open for navigating to a webpage associated with the URL. Alternatively, the participant may open a web browser and navigate to the webpage. When the webpage is open, the participant may share the content of the webpage with the other participants in the meeting.

When the participant shares the contents of the webpage, the contents may be displayed in place of icon 310. In this example, the area inside dotted line 330 may be replaced with the contents of the web page. The content shared by the participant (e.g., Participant 1) is subordinate to the content shared by the coordinator or the host. In other words, Participant 1 ' s sharing ends when the coordinator or the host moves forward in the main presentation. For example, if the coordinator or host moves to a new slide in a presentation, Participant 1' s content is no longer shared in the online meeting.

Although the example illustrated in FIG. 3 shows content from a webpage being shared within the host's main share during the online meeting, content from different applications may be shared within the host's main share. Additionally, according to embodiments described herein, the subordinate shared content may be from a different application than the coordinator or host's shared content. For example, the host may be presenting the main share using slides from a first application and the participant (e.g., Participant 1) may share subordinate content using a different application (e.g., a word processing application, a spreadsheet application, a whiteboard application, a web browser application, etc.). In this way, information that may be best presented using a particular application may easily be shared even when the host is sharing using a different application.

Figure 4:
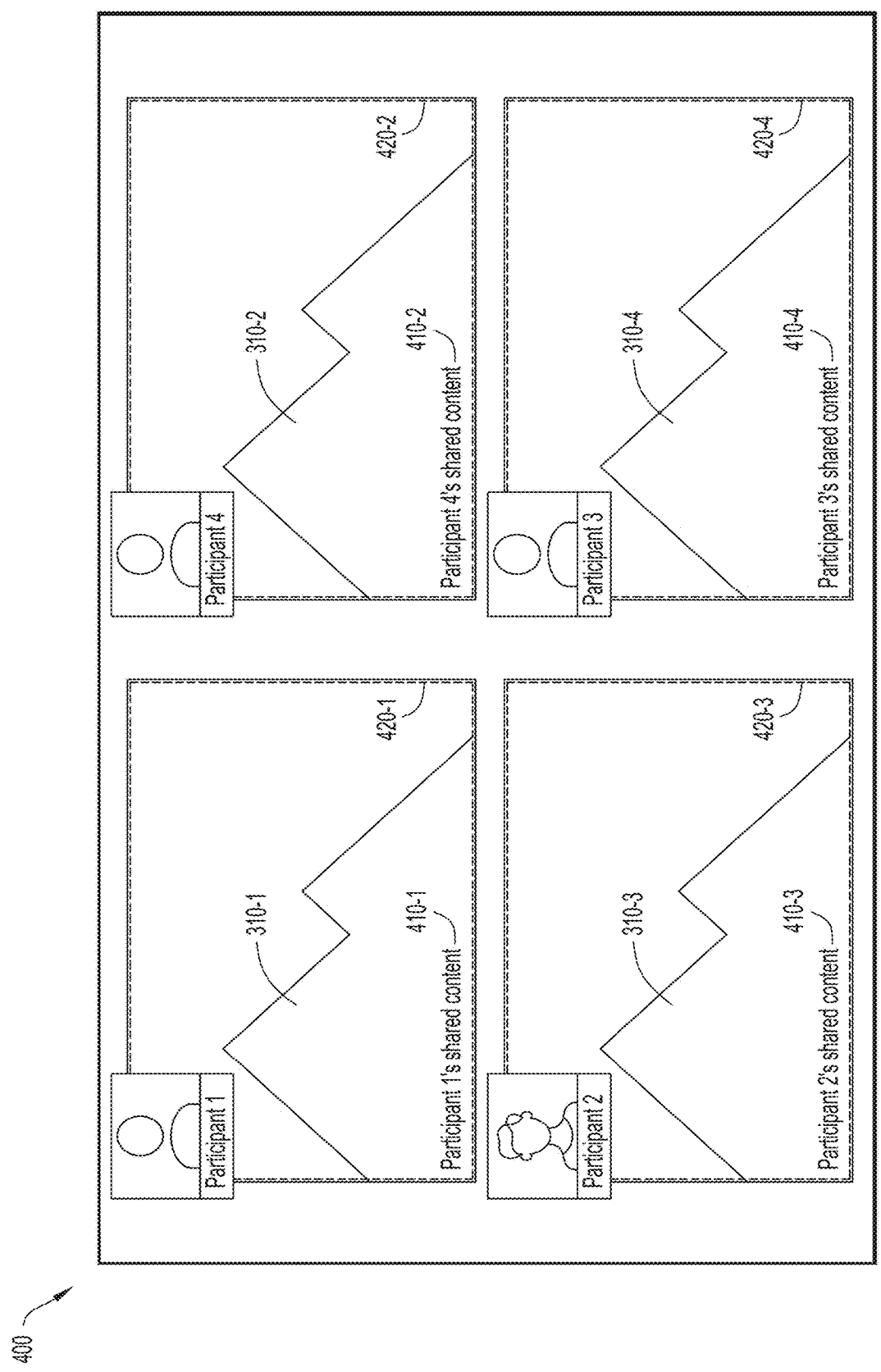
FIG. 4 shows a user interface depicting an example in which content from multiple participants replaces visual objects in content shared by a meeting host or coordinator, according to an example embodiment.

Reference is now made to FIG. 4. FIG. 4 illustrates a user interface 400 depicting an example in which content from multiple participants replaces visual objects in content shared by a meeting host or coordinator.

In the example illustrated in FIG. 4, a meeting host or coordinator shares content that includes icons 310-1, 310-2, 310-3, and 310-4 and text 410-1, 410-2, 410-3, and 410-4. In this example, the ML module 160 may identify the icons 310-1 to 310-4 as placeholders for shared content. In the example illustrated in FIG. 4, icons 310-1 to 310-4 are mountain icons, but any icons may be included in the shared content. As described above with respect to FIG. 3, different icons may represent different actions.

After identifying icons 310-1 to 310-4, ML module 160 may identify and parse text 410-1 to 410-4. As illustrated in FIG. 4, text 410-1 says "Participant 1's shared content," text 410-2 says "Participant 4's shared content," text 410-3 says "Participant 2's shared content," and text 410-4 says "Participant 3's shared content." Based on parsing the text 410-1 to 410-4, ML module 160 determines where to obtain the shared content and where the shared content is to be displayed within the main shared content. In this example, the content is obtained from participants in the online meeting.

In some embodiments, ML module 160 may transmit instructions to the participants to share the content. For example, similar to the example described above with respect to FIG. 3, ML module 160 may transmit a message to Participant 1 with instructions to share the content. Participant 1 may open and share the content and Participant 1's shared content may replace the area within dotted line 420-1. Similarly, content shared by Participant 4 may replace the area inside dotted line 420-2, content shared by Participant 2 may replace the area within dotted line 420-3, and content shared by Participant 3 may replace the area within dotted line 420-4. In some embodiments, ML module 160 may not transmit a message to the participants with instructions to share the content. Instead, the participants may share the content without receiving the instructions and ML module 160 may replace icons 310-1 to 310-4 with the appropriate shared content. In some embodiments, an image or live video feed of the participant sharing the content may be shown alongside the shared content.

In some embodiments, the content shared by the different participants may be from different applications. In addition, the content shared by the different participants may be from different applications than the main content. For example, the meeting host or coordinator may share the main content using a slideshow application and the subordinate shared content may be content from a word processing application, a spreadsheet application, a web browsing application, a whiteboard application, and/or different applications.

By sharing content from multiple people at the same time, different data or aspects associated with a presentation may be shared at the same time. By using the natural markup language, the content may be easily and quickly be shared by multiple participants using one or more applications at the same time.

Figure 5:
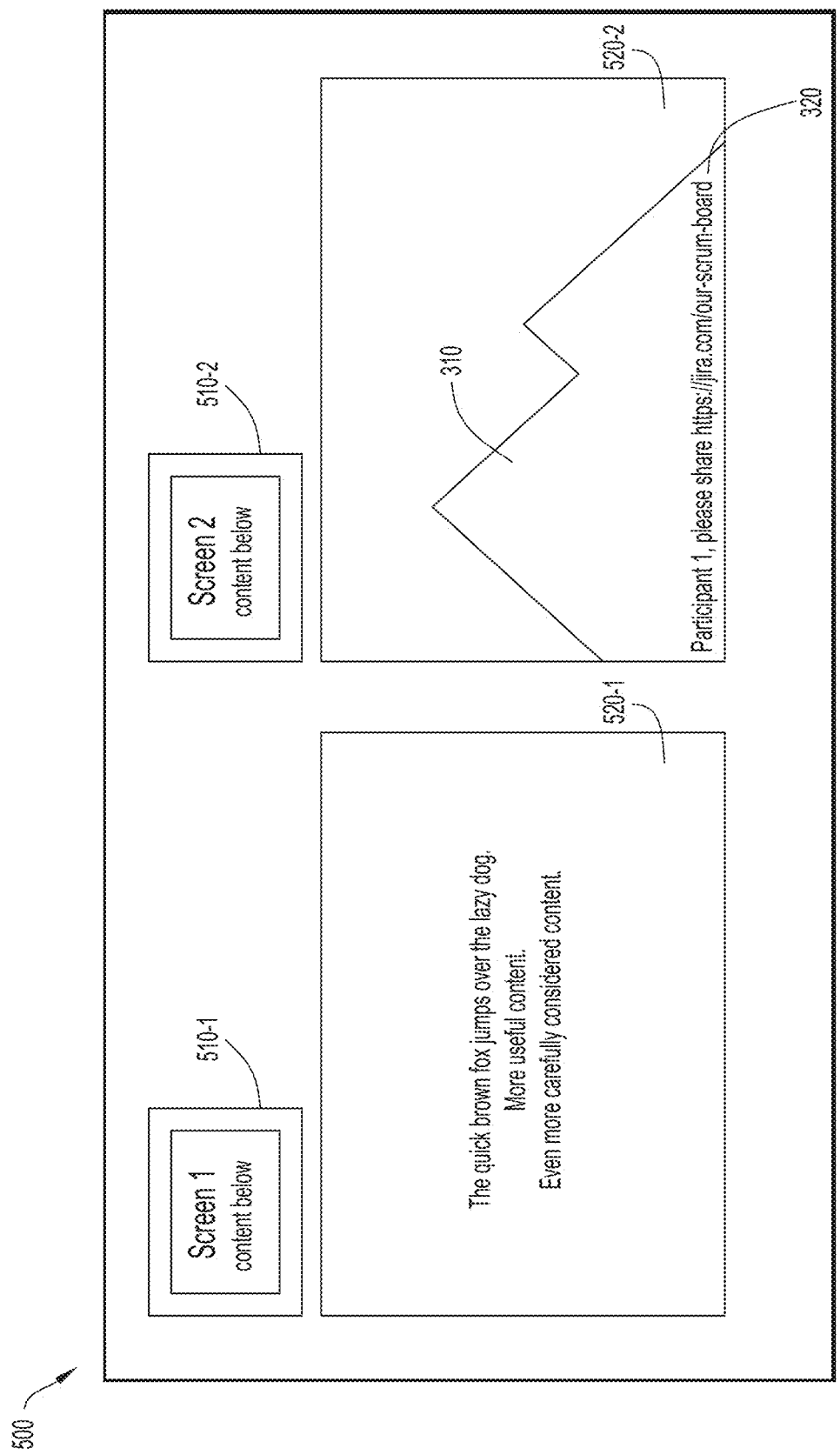
FIG. 5 shows a user interface depicting an example in which content is divided between screens in response to detecting graphics and/or text in content shared by a meeting host or coordinator, according to an example embodiment.

Reference is now made to FIG. 5. FIG. 5 illustrates a user interface 500 depicting an example in which content is divided between screens in response to detecting graphics and/or text in content shared by a meeting host or coordinator.

In the example illustrated in FIG. 5, a meeting host or coordinator shares content that includes icons 510-1 and 510-2 and content 520-1 and 520-2. Content 520-1 includes icon 310 and text 320. In this example, the ML module 160 may identify the icons 510-1 and 510-2 and determine, based on the icons 510-1 and 510-2, that content 520-1 and 520-2 are to be divided across multiple screens or display areas. As shown in FIG. 5, icon 510-1 reads "Screen 1 content below" and icon 510-2 reads "Screen 2 content below." Therefore, ML module 160 identifies icons 510-1 and 510-2 and, based on parsing the text in the icons, displays content 520-1 on a first screen or display area and content 520-2 on a second screen or display area of participants' devices 120-2 to 120-N.

In addition, ML module 160 may identify icon 310 and text 320 in content 520-2. Based on the icon 310 and the text 320, ML module 160 may request that Participant 1 share the content in the website identified in text 320 in a manner described above in FIG. 3. In this example, participants (i.e., participants with multiple screens) participating in the online meeting may see content 520-1 on a first screen and the website shared by Participant 1 on a second screen. Although FIG. 5 illustrates an example in which one of the screens displays content shared from a participant in the online meeting, in other embodiments, content 520-1 and 520-2 may be any type of content. For example, content 520-1 and 520-2 may both be content shared by the meeting host, one of content 520-1 or 520-2 may be content from an application (e.g., a whiteboard application), or different types of content may be displayed on different screens or display areas.

In some embodiments, when a participant does not have multiple screens, network server(s) 110 may present content 520-1 and 520-2 on a single screen. In this scenario, content 520-1 may be displayed in a first content area on the screen and content 520-2 may be displayed in a second content area on the screen. In some embodiments, content 520-1 may fill a first screen or the first content area if a participant has granular layout controls. Similarly, content 520-2 may fill a second screen or the second content area if the participant has granular layout controls.

Figure 6:
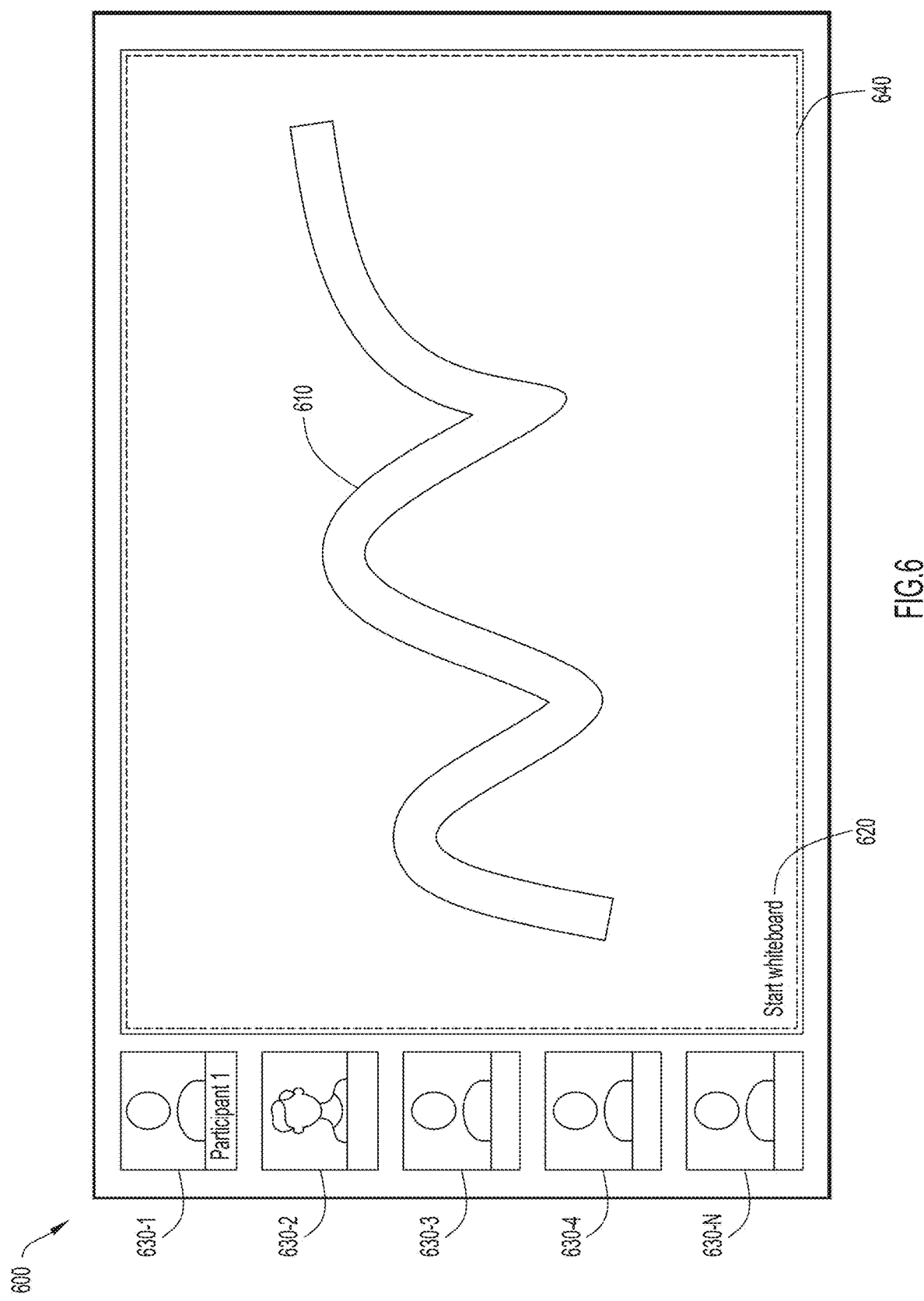
FIG. 6 shows a user interface depicting an example in which an application is launched and content from the application is shared in response to detecting graphics and/or text in content shared by a meeting host or coordinator, according to an example embodiment.

Reference is now made to FIG. 6. FIG. 6 illustrates a user interface 600 depicting an example in which an application is launched and content from the application is shared in response to detecting graphics and/or text in content shared by a meeting host or coordinator. User interface 600 includes shared content and video feeds 630-1, 630-2, 630-3, 630-4, ... 630-N of participants in the online meeting.

In the example illustrated in FIG. 6, a meeting host or coordinator may share content that includes graphic 610 and text 620. In this example, graphic 610 corresponds to a whiteboard application. In some embodiments, different graphics may correspond to different applications. In addition, text 620 says "Start whiteboard." ML module 160 may identify graphic 610 and/or text 620 and, based on the identification, automatically launch a whiteboard application and share content from the whiteboard application. In this example, since the text 620 does not identify a participant in the online meeting, meeting server(s) 110 may launch the whiteboard application on a user device associated with the meeting host or coordinator (e.g., endpoint device 120-1) and share the content from the whiteboard application within dotted line 640.

Since graphic 610 is associated with the whiteboard application, meeting server(s) 110 may launch whiteboard application on the meeting host's user device and share the content with other participants when user interface 600 does not include text 620. In other embodiments, the whiteboard application may be launched and the content from the whiteboard application may be shared with other participants if a different graphic (such as, for example, the mountain graphic illustrated in FIG. 3) that indicates that additional content is to replace the area surrounding the graphic is displayed and text 620 reads "Start whiteboard." In other embodiments, if text 620 identifies a participant other than the host of the meeting, meeting server(s) 110 may instruct the identified participant to launch the whiteboard and the content from the whiteboard of the identified participant may replace the area within dotted line 640.

Figure 7:
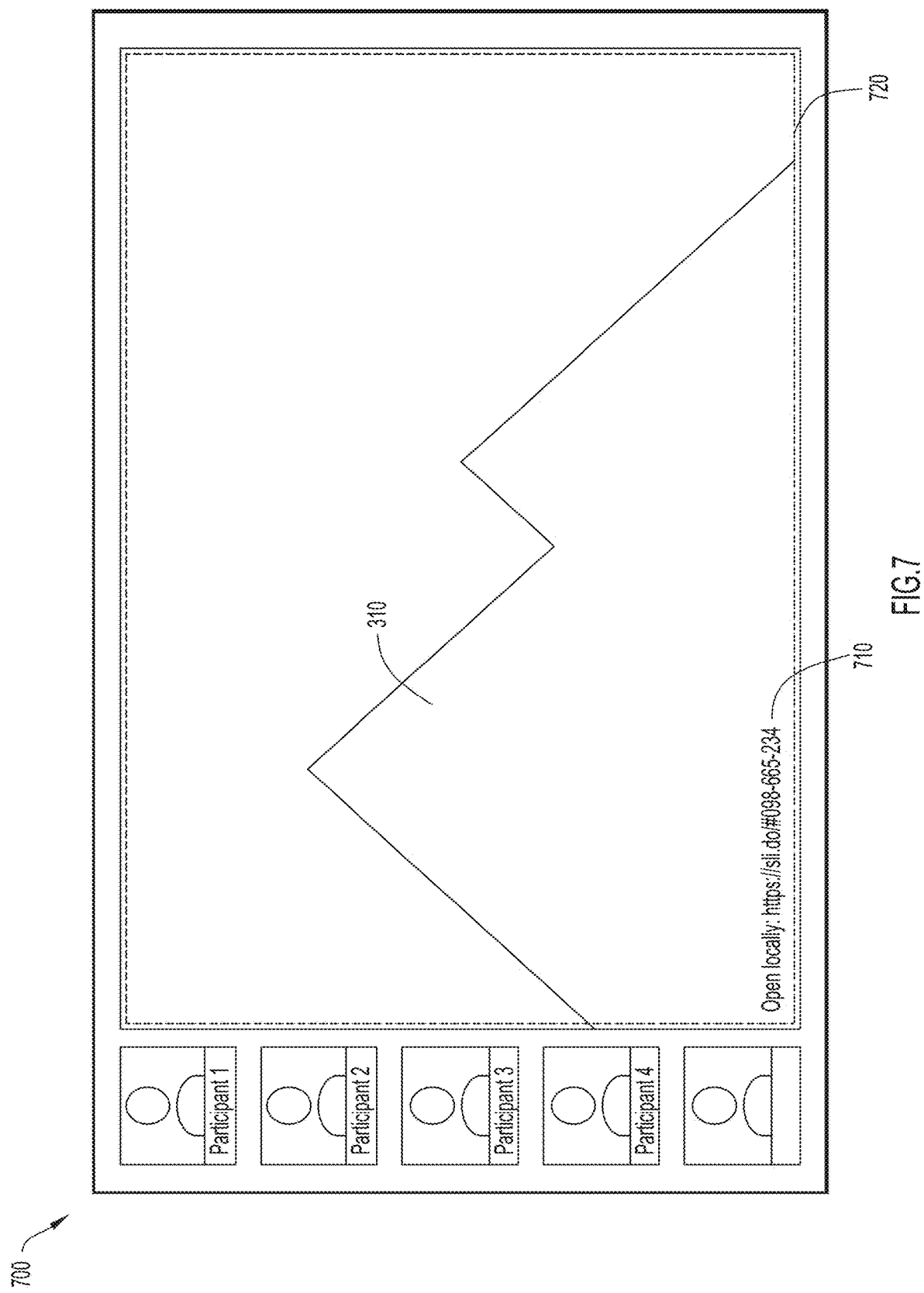
FIG. 7 shows a user interface depicting another example in which a visual object is replaced with shared content in response to detecting graphics and/or text in content shared by a meeting host or coordinator, according to an example embodiment.

Reference is now made to FIG. 7. FIG. 7 illustrates a user interface 700 depicting an example in which a visual object is replaced with shared content in response to detecting graphics and/or text shared by a meeting host or coordinator.

In the example illustrated in FIG. 7, a meeting host or coordinator shares content that includes icons 310 and text 710. In this example, the ML module 160 may identify the icon 310 as a placeholder for shared content. In the example illustrated in FIG. 7, icon 310 is a mountain icon, but any icons may be included in the shared content. As described above, different icons may represent different actions.

After identifying icon 310, ML module 160 may identify and parse text 710. As illustrated in FIG. 7, text 710 says "Open locally: https://slid.do/#098-665-234." Based on parsing the text 710, ML module 160 may launch a web viewer on the local device (e.g., endpoint device 120-1 associated with a meeting host or coordinator) to navigate to the URL identified in text 710. The content from the web site corresponding to the URL is displayed for all meeting participants in an area inside dotted line 720.

Figure 8:
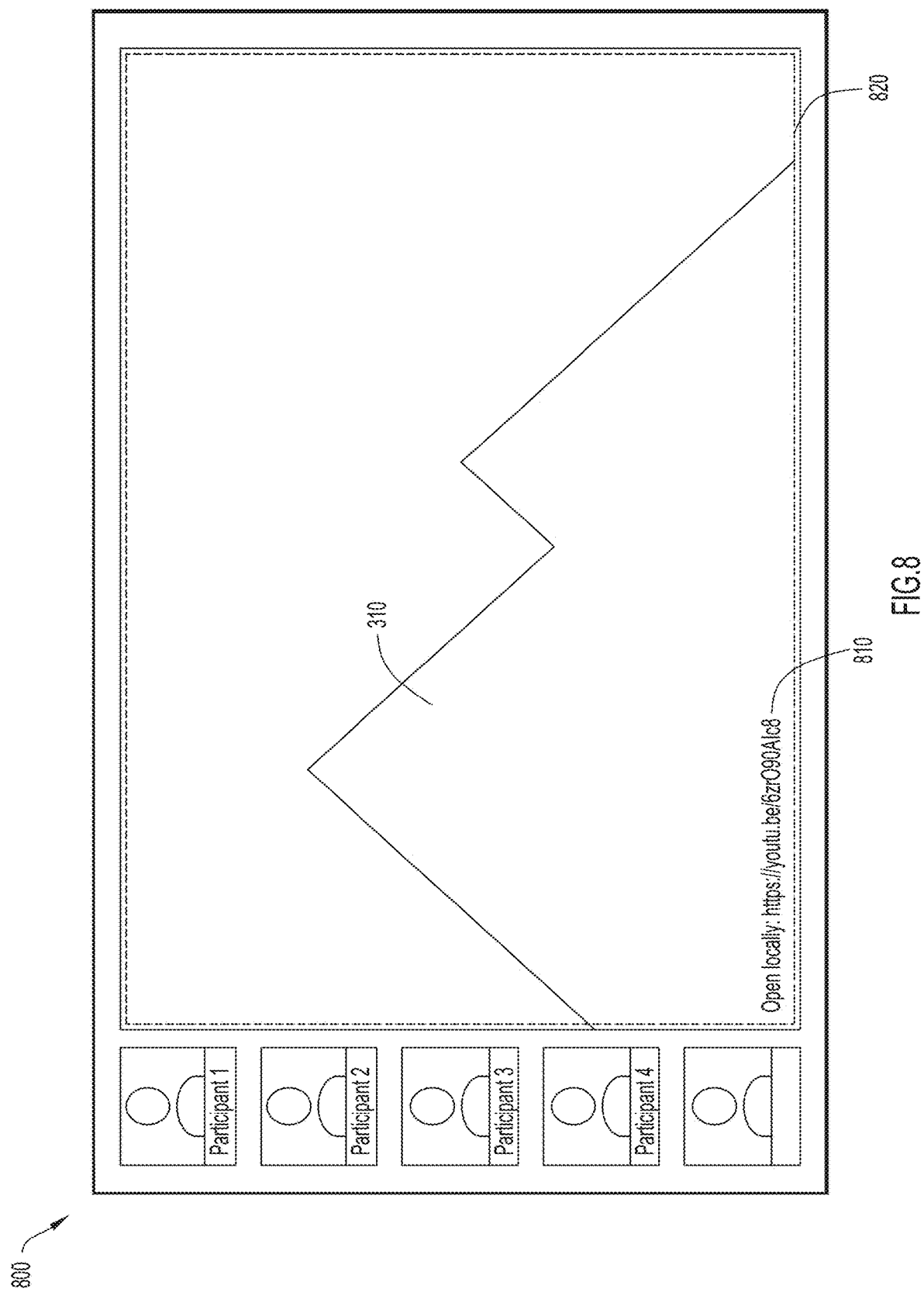
FIG. 8 shows a user interface depicting yet another example in which a visual object is replaced with shared content in response to detecting graphics and/or text in content shared by a meeting host or coordinator, according to an example embodiment.

Reference is now made to FIG. 8. FIG. 8 illustrates a user interface 800 depicting an example in which a visual object is replaced with shared content in response to detecting graphics and/or text in content shared by a meeting host or coordinator.

In the example illustrated in FIG. 8, a meeting host or coordinator shares content that includes icons 310 and text 810. In this example, the ML module 160 may identify the icon 310 as a placeholder for shared content. In the example illustrated in FIG. 8, icon 310 is a mountain icon, but any icons may be included in the shared content. As described above, different icons may represent different actions.

After identifying icon 310, ML module 160 may identify and parse text 810. As illustrated in FIG. 8, text 810 says "Open locally: https://youtu.be/6ZrO90AI0c8." Based on parsing the text 810, ML module 160 launches a web viewer on the local device (e.g., endpoint device 120-1 associated with a meeting host or coordinator) to navigate the URL identified in text 810. The specified media (e.g., a video) from the web site corresponding to the URL is displayed for all meeting participants in an area inside dotted line 820. In this example, instead of displaying all of the content from the webpage corresponding to the URL for all participants in the meeting, ML module 160 recognizes that the web page corresponding to the URL is displaying media, such as a streaming video, and shares only the media for the participants in the online meeting.

Figure 9:
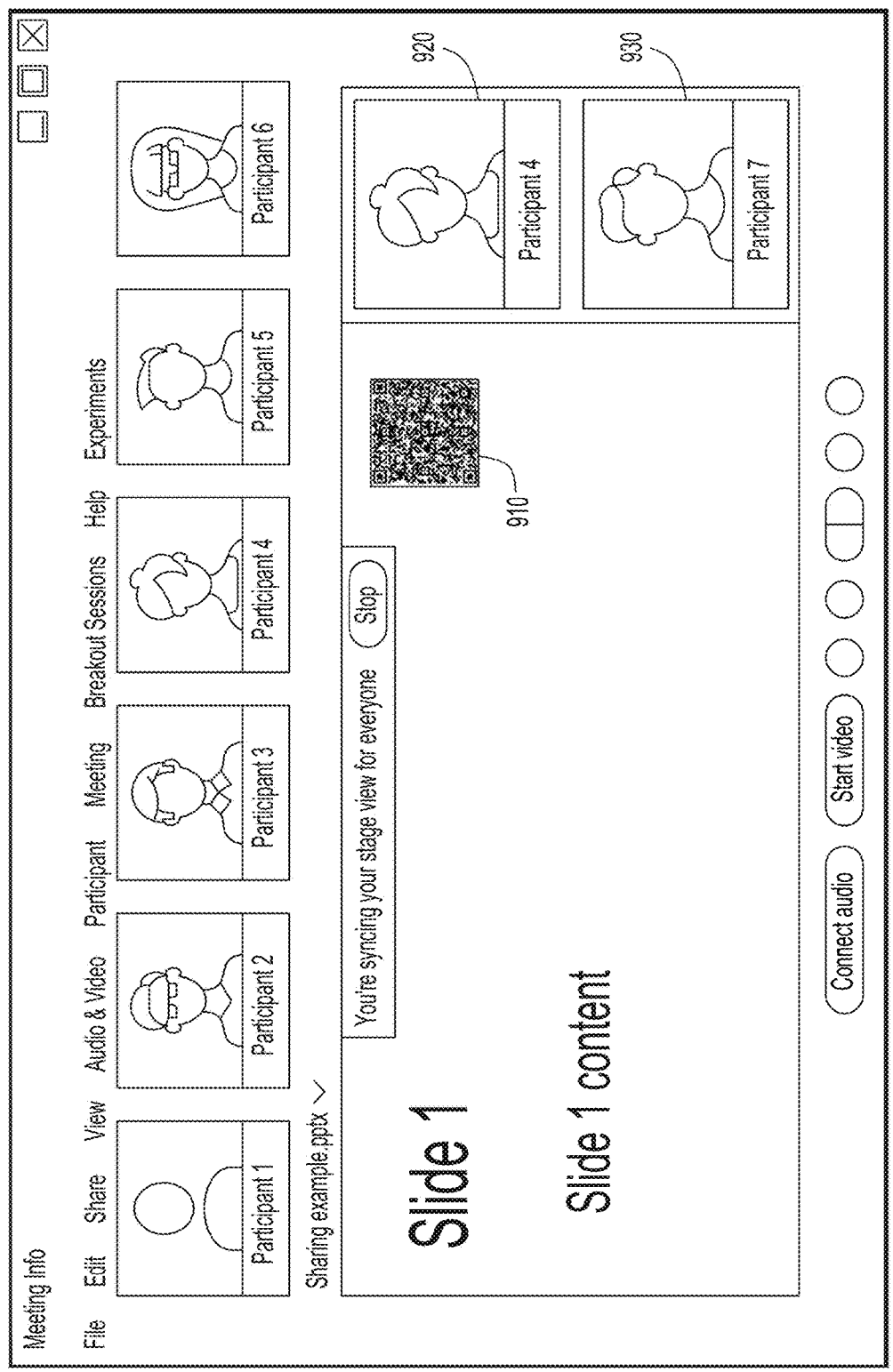
FIG. 9 shows a user interface depicting an example in which video streams of participants replace a portion of a screen based on detecting a graphic and/or text in content shared by a meeting host or coordinator, according to an example embodiment.

Reference is now made to FIG. 9. FIG. 9 illustrates a user interface 900 depicting an example in which video streams of participants replace a portion of a screen based on detecting a graphic or text in content shared by a meeting host or coordinator.

In the example illustrated in FIG. 9, a meeting host or coordinator is sharing content that includes a quick response (QR) code 910. ML module 160 may detect QR code 910 and may parse the QR code 910 to identify the content of the QR code 910. The content of the QR code 910 may be plain text, XML text, etc. Particular keywords may be used to distinguish the QR code 910 from other QR codes. For example, an XML root node "<stageInfo>" may indicate that particular meeting participants are to be brought forward or to the "stage" for presenting information (such as information associated with the content being shared by the meeting host or coordinator). The content of the QR code 910 contains participant information (e.g., email addresses, employee identifier, etc.), sync stage information (whether to automatically synchronize to other participants), etc.

The QR code 910 includes the following exemplary information:

```
<?xml version="1.0"?>
<stageInfo>
<participants
<email>participant4@abc.com</email>
<email>participant7@abc.com</email>
</participants>
<sync>1</sync>
</stageInfo>
```

By parsing the information in QR code 910, ML module 160 identifies that participants Participant 4 (with email address participant4@abc.com) and Participant 7 (with email address participant7@abc.com) are to be brought forward to present content and the stage information is to be synchronized to other participants. As shown in FIG. 9, video feed 920 (e.g., Participant 4's video feed) and video feed 930 (e.g., Participant 7's video feed) are brought forward and placed on the screen next to the shared content. In this example, video feeds 920 and 930 replace the area to the right of the shared content, but video feeds 920 and 930 may replace other areas of user interface 900. In some embodiments, video feeds 920 and 930 may replace graphics within the content shared by the meeting host or coordinator. QR code 910 may be blurred or cropped so other participants cannot view QR code 910. In other embodiments, video feeds 920 and 930 may replace QR code 910 so the other participants may view video feeds 920 and 930 instead of QR code 910.

In this example, when the meeting host or coordinator shares different content (e.g., by moving to a next slide in a presentation), the video feeds 920 and 930 will no longer be highlighted and the video feeds will once again be in the filmstrip of video feeds associated with the online meeting.

Figure 10:
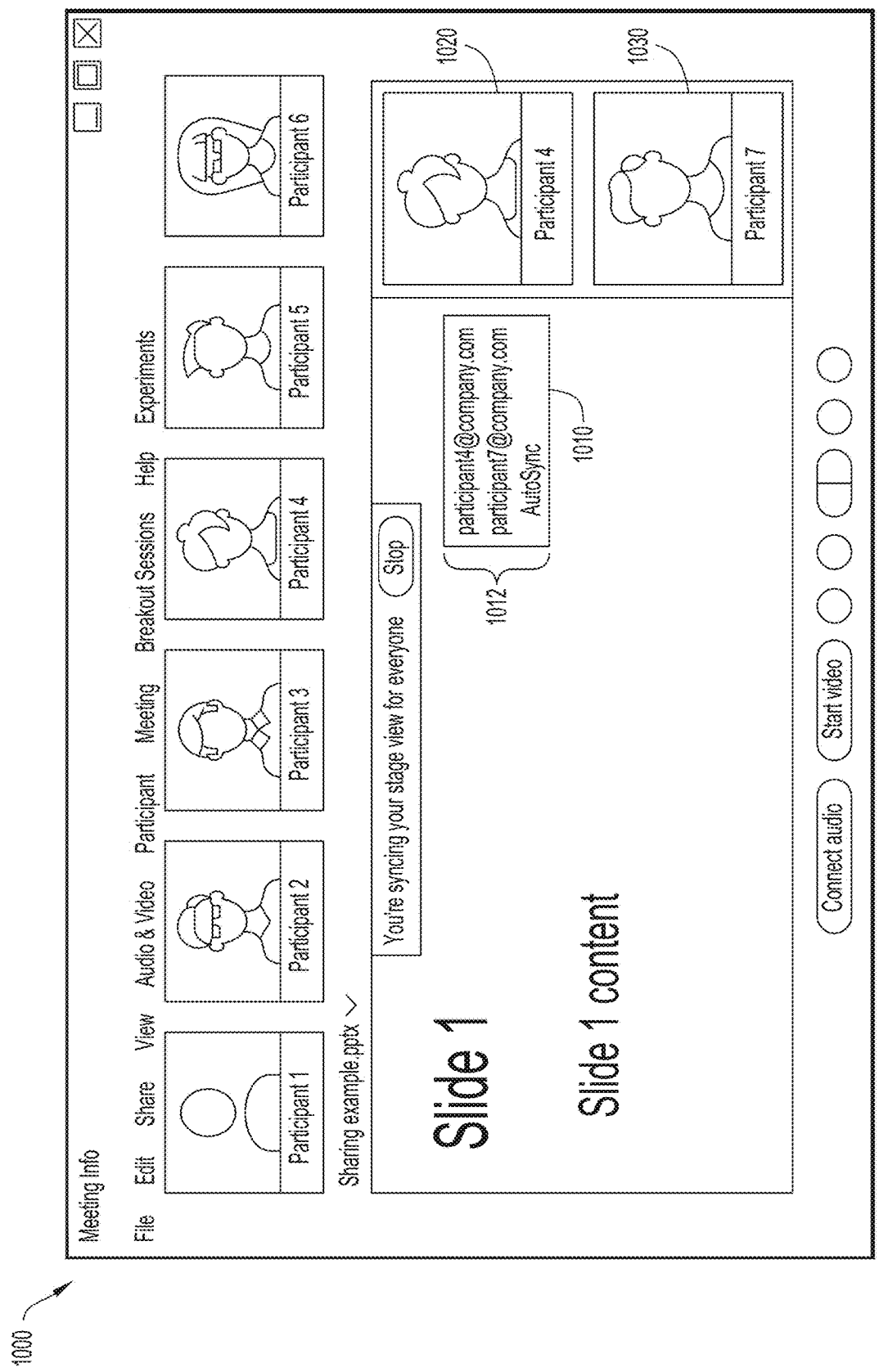
FIG. 10 shows a user interface depicting another example in which video streams of participants replace a portion of a screen based on detecting a graphic and/or text in content shared by a meeting host or coordinator, according to an example embodiment.

Reference is now made to FIG. 10. FIG. 10 illustrates a user interface 1000 depicting an example in which video streams of participants replace a portion of a screen based on detecting a graphic or text.

In the example illustrated in FIG. 10, a meeting host or coordinator is sharing content that includes a box 1010 including text 1012. ML module 160 may detect box 1010 and parse text 1012. For example, ML module 160 may use optical character recognition (OCR) or another technology to detect the text 1012 inside box 1010. The text 1012 may include information associated with an action to perform. In some embodiments, different properties (e.g., color) of box 1010 may be associated with different actions (such as highlighting or bringing to the stage participants of the online meeting). The text 1012 may include, for example, participant information (e.g., email addresses, employee identifier, etc.), sync stage information (whether to automatically synchronize the stage to other participants), etc. In the example illustrated in FIG. 9, text 1012 says "participant4@company.com," "participant7@company.com," and "AutoSync." In this example, the text 1012 indicates that the video feeds of Participant 4 (corresponding to the email address participant4@company.com) and Participant 7 (corresponding to the email address participant7@company.com) are to be highlighted or brought to the stage and the stage is to be synchronized with other participants in the online meeting.

As shown in FIG. 10, video feed 1020 (e.g., Participant 4's video feed) and video feed 1030 (e.g., Participant 7's video feed) are brought forward and placed on the screen next to the shared content. In this example, video feeds 1020 and 1030 replace the area to the right of the shared content, but, in other examples, video feeds 1020 and 1030 may replace other areas of user interface 1000. In some embodiments, video feeds 1020 and 1030 may replace graphics within the content shared by the meeting host or coordinator. Box 1010 and/or text 1012 may be blurred or cropped so other participants cannot view box 1010 and/or text 1012. In other embodiments, video feeds 1020 and 1030 may replace box 1010 and text 1012 so the other participants may view video feeds 1020 and 1030 instead of box 1010 and text 1012.

In this example, when the meeting host or coordinator shares different content (e.g., by moving to a next slide in a presentation), the video feeds 1020 and 1030 will no longer be highlighted and the video feeds will once again be in the filmstrip of video feeds associated with the online meeting.

In some embodiments, in a meeting where too many participants are participating to show all participants in the filmstrip, text, such as text 1012, may be used to identify the participants whose video feeds or images are to be prioritized or displayed in the filmstrip. For example, if the text 1012 in the shared content says "Team: Participant 4 & Participant 7," ML module 160 may identify the video feeds or images of Participant 4 and Participant 7 and promote the video feeds so the video feeds become visible even when Participant 4 and Participant 7 are not speaking. Promoting the video feeds may entail including the video feeds in the visible part of the filmstrip, enlarging the video feeds, moving the video feeds, etc. ML module 160 may recognize the text 1012 even if the text 1012 is not within box 1010. For example, if the text 1012 is in a predetermined format, ML module 160 may perform actions based on identifying the text without a graphic.

Figure 11:
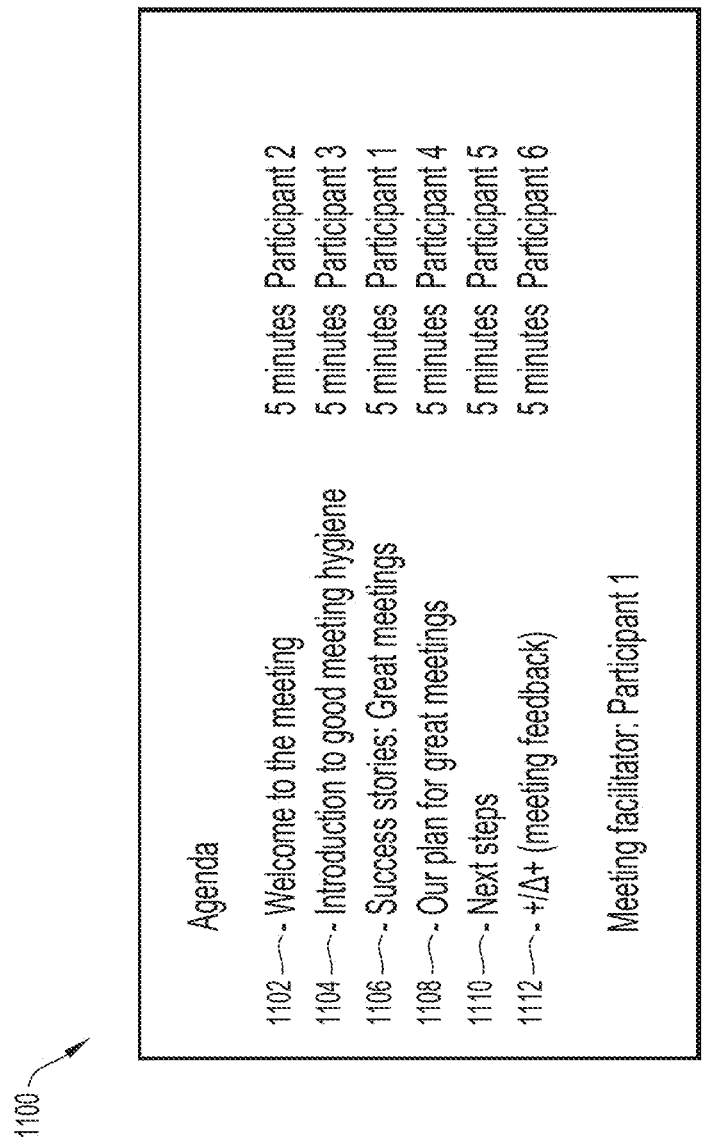
FIG. 11 illustrates an exemplary agenda associated with an online meeting, according to an example embodiment.

Reference is now made to FIG. 11. FIG. 11 illustrates an exemplary agenda 1100 associated with an online meeting.

In an example associated with FIG. 11, ML module 160 may detect and interpret agenda 1100. Agenda 1100 includes items 1102, 1104, 1106, 1108, 1110, and 1112. Each item 1102-1112 includes a title associated with a portion of a meeting, a length of time associated with the portion of the meeting, and a presenter associated with the portion of the meeting. Agenda 1100 additionally indicates that the meeting facilitator (e.g., a meeting host or coordinator) is Participant 1. Based on agenda 1100, ML module 160 may perform actions, such as sending messages to the meeting facilitator and/or presenter to keep the meeting running on time. For example, after Participant 4 has been presenting for 3 minutes of the allotted 5 minutes, ML module 160, meeting server(s) 110, or an endpoint device 120 may send a notification to Participant 4 with text, such as, "There are 2 minutes left of your allotted presentation time." ML module 160, meeting server(s) 110, or an endpoint device 120 may additionally send a message to Participant 1 saying "There are 2 minutes left of Participant 1's allotted presentation time." In this way, the presenter and/or meeting host may be kept aware of the remaining time in order to ensure the meeting stays on track and is running smoothly.

Reference is now made to FIG. 12. FIG. 12 is a flow diagram illustrating a method 1200 of obtaining and displaying content based on detecting a visual object in shared content during an online meeting, according to an embodiment. Method 1200 may be performed by endpoint devices 120-1 to 120-N and/or meeting server(s) 110.

At 1210, shared content is obtained during an online meeting. The shared content is shared by a first participant in the online meeting for display on devices of one or more second participants in the online meeting. For example, a host or organizer of an online meeting may share content using endpoint device 120-1 for display on endpoint devices 120-2 to 120-N of other participants in the online meeting.

At 1220, a visual object is detected in the shared content. For example, a ML module, such as ML module 160, may analyze the shared content using an artificial intelligence process that is trained to recognize the visual object. The visual object may be, for example, a graphic, a QR code, text, or another visual object.

At 1230, additional content may be obtained based on detecting the visual object. For example, the visual object may be associated with a particular type of content, the visual object may indicate the additional content and/or a user associated with the additional content, the ML module 160 may parse text to identify the additional content based on detecting the visual object, or the additional content may be obtained in additional ways. The additional content may be video feeds associated with participants in the online meeting, content shared by a participant in the online meeting, content from an application identified by the visual object, content from a web page, media obtained from a web page or another source, or a different type of content.

At 1240, the additional content is transmitted with the shared content for display on the devices of the one or more second participants. For example, in one embodiment, the additional content may replace the visual object in the shared content and the shared content with the additional content may be shared for display on endpoint devices 120-2 to 120-N. In another embodiment, the additional content may be placed next to the shared content for display on endpoint devices 120-2 to 120-N.

The markup language described with respect to FIGS. 1-12 may enable a meeting facilitator to plan content sharing, plan participation, prioritize participants' video streams, control a meeting, populate a layout area, perform a simple survey, show specific, local xStatus, or perform additional actions. When planning content sharing, the facilitator may share predefined content (referenced by, for example, URL or application name), share content from predefined participants (reference by, for example, a name or email address), position shared content in a particular layout area, position multiple pieces of content simultaneously, share multiple pieces of content across multiple screens, open a whiteboard application for all participants, open a local web view for all participants, open a web application for all participants, open a media file for all participants (e.g., a piece of music that starts synchronous playback), present "contextually transparent" slides (e.g., minimize presentation) that make content sharing temporarily stop to focus on presenter/participants, present a "smaller presentation window" mode when simple content is show, but the focus is primarily on the presenter/participants, etc.

When planning participation, the facilitator may position specific participants in a particular layout area, position undefined participants in a particular layout area, mute and request unmuting of various audience groups, let participants in/out from the greenroom (backstage), call participant based on spoken or written words, alert participants about upcoming agenda items, inform participants about elapsed time in a current segment, etc. When prioritizing participants' video streams, the facilitator may infer which participants are to be prioritized based on content (e.g., based on whether the participants' names are on the slide).

When controlling a meeting, the facilitator may switch layout mode (e.g., People focus on/off), on an early slide, inform overall experience (e.g., "formal mode" shows name label as "J. Smith," "informal mode shows name label as "Jane S.," and "colleague mode" hides labels, "main participants" informs the names of the participants that should eb prioritized when possible), start, pause, resume, and stop recording (e.g., "Starting recording in 5 seconds, click here to cancel"), show chat, set camera presets (e.g., to view physical whiteboard, scene, audience, prototype, track a moving participant, etc.), present teleprompter text to planned speaker (e.g., text and name of speaker is in a dedicated area, which is masked or cropped away when viewed by other audience members), plan breakout rooms for participant segments, etc.

The facilitator may populate a layout area with a list of all current participants, a list of all current participants with contact information retrieved from respective local devices, a list of all participants and when they entered and left a meeting, calendar availability of all participants (e.g., this week or during the summer holiday), a geographical map with pinned locations for all participants, a local time for a particular participant (e.g., to be shown under the participant's feed), a summary slide that shows all action items, tasks, notes, and highlights submitted during the meeting, etc.

The facilitator may perform a simple survey with the results shown on the next/subsequent slide and stored in chats. The survey types may include a vote between options (result: vote count for each option), rate 1-5 stars (result: mean value), participants' individual comments (result: list of comments), participants' individual keywords (result: word cloud), etc. A facilitator may additionally show specific local xStatus (e.g., for debugging purposes; only shown locally, but potentially with "copy value" affordance).

In some embodiments, if the "markup area" (e.g., graphic, text, QR code, etc.) is not in an area that is to be replaced by other content, the markup area may be masked when presenting the slide by, e.g., filling in the slide with the general background color, blurring the markup area, etc. If the markup area is in a margin, the markup area may be cropped.

Figure 13:
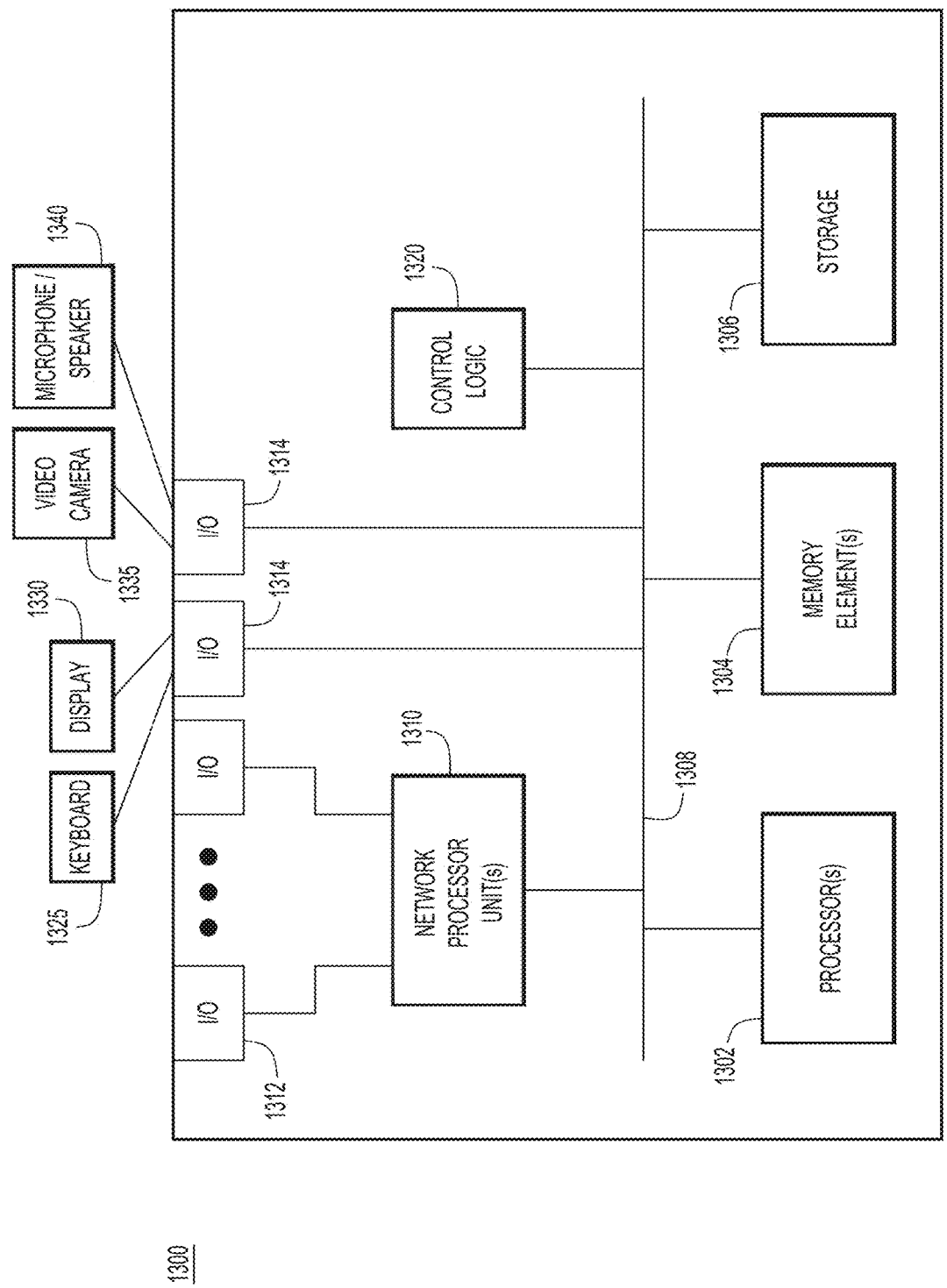
FIG. 13 is a hardware block diagram of a device that may be configured to perform the endpoint device-based operations involved in obtaining and displaying content based on detecting a visual object in content shared by a meeting host or coordinator during an online meeting, according to an example embodiment.

Referring to FIG. 13, FIG. 13 illustrates a hardware block diagram of a computing/computer device 1300 that may perform functions of a video endpoint device or an end device associated with operations discussed herein in connection with the techniques depicted in FIGS. 1-12. In various embodiments, a computing device, such as computing device 1300 or any combination of computing devices 1300, may be configured as any devices as discussed for the techniques depicted in connection with FIGS. 1-12 in order to perform operations of the various techniques discussed herein.

In at least one embodiment, the computing device 1300 may include one or more processor(s) 1302, one or more memory element(s) 1304, storage 1306, a bus 1308, one or more network processor unit(s) 1310 interconnected with one or more network input/output (I/O) interface(s) 1312, one or more I/O interface(s) 1314, and control logic 1320. In various embodiments, instructions associated with logic for computing device 1300 can overlap in any manner and are not limited to the specific allocation of instructions and/or operations described herein.

In at least one embodiment, processor(s) 1302 is/are at least one hardware processor configured to execute various tasks, operations and/or functions for computing device 1300 as described herein according to software and/or instructions configured for computing device 1300. Processor(s) 1302 (e.g., a hardware processor) can execute any type of instructions associated with data to achieve the operations detailed herein. In one example, processor(s) 1302 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1304 and/or storage 1306 is/are configured to store data, information, software, and/or instructions associated with computing device 1300, and/or logic configured for memory element(s) 1304 and/or storage 1306. For example, any logic described herein (e.g., control logic 1320) can, in various embodiments, be stored for computing device 1300 using any combination of memory element(s) 1304 and/or storage 1306. Note that in some embodiments, storage 1306 can be consolidated with memory element(s) 1304 (or vice versa), or can overlap/exist in any other suitable manner.

In at least one embodiment, bus 1308 can be configured as an interface that enables one or more elements of computing device 1300 to communicate in order to exchange information and/or data. Bus 1308 can be implemented with any architecture designed for passing control, data and/or information between processors, memory elements/storage, peripheral devices, and/or any other hardware and/or software components that may be configured for computing device 1300. In at least one embodiment, bus 1308 may be implemented as a fast kernel-hosted interconnect, potentially using shared memory between processes (e.g., logic), which can enable efficient communication paths between the processes.

In various embodiments, network processor unit(s) 1310 may enable communication between computing device 1300 and other systems, entities, etc., via network I/O interface(s) 1312 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 1310 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1300 and other systems, entities, etc. to facilitate operations for various embodiments described herein. In various embodiments, network I/O interface(s) 1312 can be configured as one or more Ethernet port(s), Fibre Channel ports, any other I/O port(s), and/or antenna(s)/antenna array(s) now known or hereafter developed. Thus, the network processor unit(s) 1310 and/or network I/O interface(s) 1312 may include suitable interfaces for receiving, transmitting, and/or otherwise communicating data and/or information in a network environment.

I/O interface(s) 1314 allow for input and output of data and/or information with other entities that may be connected to computer device 1300. For example, I/O interface(s) 1314 may provide a connection to external devices such as a keyboard 1325, keypad, a touch screen, and/or any other suitable input and/or output device now known or hereafter developed. This may be the case, in particular, when the computer device 1300 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display 1330 shown in FIG. 13, particularly when the computer device 1300 serves as a user device as described herein. Display 1330 may have touch-screen display capabilities. Additional external devices may include a video camera 1335 and microphone/speaker combination 1340. While FIG. 13 shows the display 1330, video camera 1335 and microphone/speaker combination 1340 as being coupled via one of the I/O interfaces 1314, it is to be understood that these components may instead be coupled to the bus 1308.

In various embodiments, control logic 1320 can include instructions that, when executed, cause processor(s) 1302 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1320) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1304 and/or storage 1306 can store data, software, code, instructions (e.g., processor instructions), logic, parameters, combinations thereof, and/or the like used for operations described herein. This includes memory element(s) 1304 and/or storage 1306 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Figure 14:
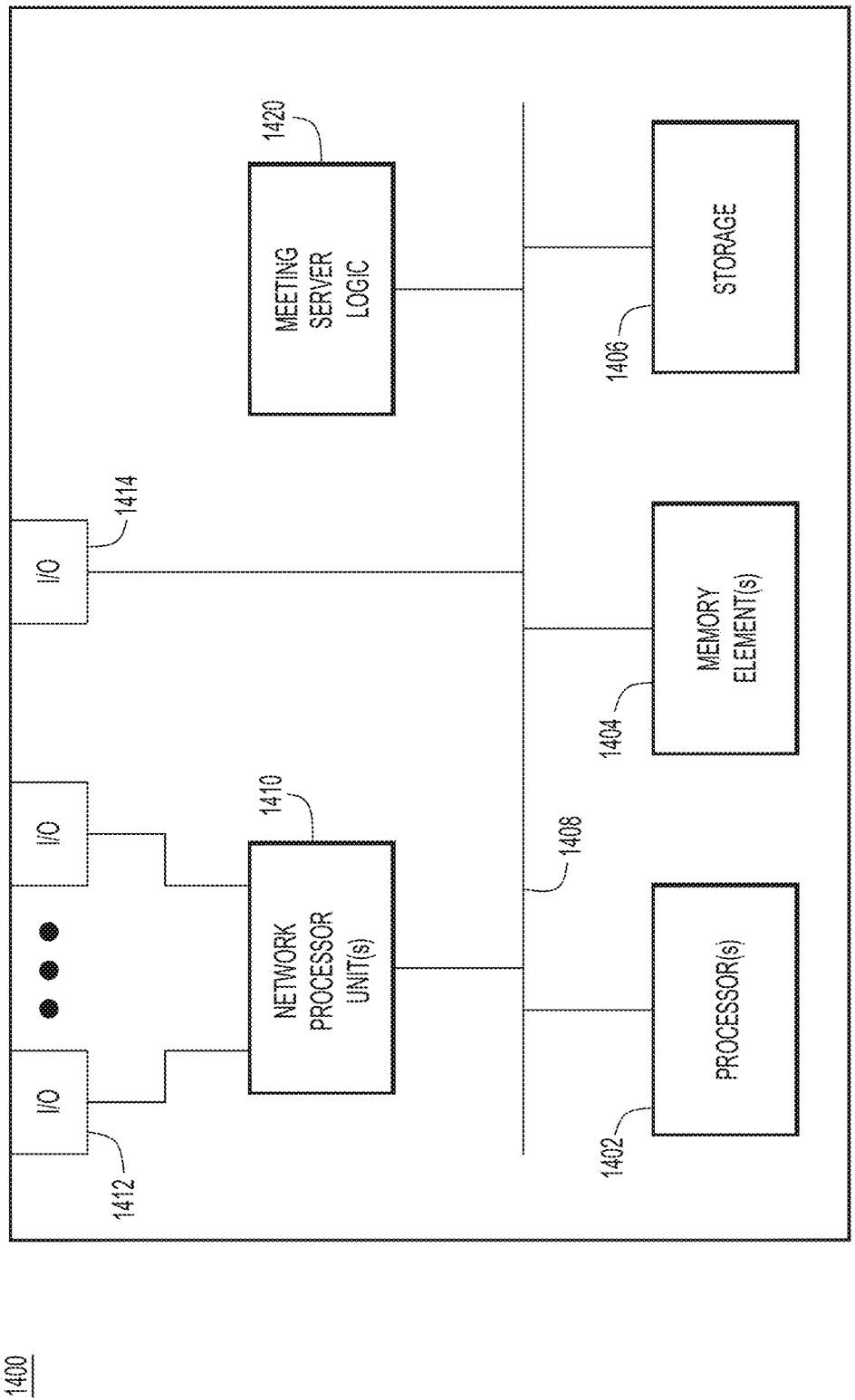
FIG. 14 is a hardware diagram of a computer device that may be configured to perform the meeting server operations involved in obtaining and displaying content based on detecting a visual object in content shared by a meeting host or coordinator during an online meeting, according to an example embodiment.

FIG. 14 illustrates a block diagram of a computing device 1400 that may perform the functions of the meeting server(s) 110 described herein. The computing device 1400 may include one or more processor(s) 1402, one or more memory element(s) 1404, storage 1406, a bus 1408, one or more network processor unit(s) 1410 interconnected with one or more network input/output (I/O) interface(s) 1412, one or more I/O interface(s) 1414, and meeting server logic 1420. In various embodiments, instructions associated with the meeting server logic 1420 is configured to perform the meeting server operations described herein, including those depicted by the flow chart for method 1200 shown in FIG. 12.

In one form, a computer-implemented method comprising: obtaining shared content during an online meeting, the shared content being shared by a first participant in the online meeting for display on devices of one or more second participants in the online meeting; detecting a visual object in the shared content; obtaining additional content based on detecting the visual object; and transmitting the additional content with the shared content for display on the devices of the one or more second participants.

In one example, the shared content is associated with a first application and the additional content is associated with a second application. In another example, obtaining the additional content comprises: detecting information associated with the additional content in the shared content; and obtaining the additional content based on the information. In another example, obtaining the additional content includes transmitting a request to a second participant of the one or more second participants to share the additional content. In another example, the visual object includes a photographic image of a second participant in the online meeting and the additional content includes a video feed of the second participant.

In another example, the additional content includes additional shared content, the additional shared content being shared by a second participant of the one or more second participants. In another example, the visual object is associated with a particular application and wherein obtaining the additional content includes launching the particular application to obtain the additional content. In another example, detecting the visual object comprises analyzing the shared content using an artificial intelligence process that is trained to recognize the visual object. In another example, the visual object includes a quick response (QR) code that includes information associated with the additional content.

In another example, the computer-implemented method further comprises replacing the visual object with the additional content in the shared content. In another example, the computer-implemented method further comprises: detecting, in the shared content, a second visual object associated with second content and a third visual object associated with third content, the second visual object indicating that the second content is to be displayed in a first area on the devices of the one or more second participants, and the third visual object indicating that the third content is to be displayed in a second area on the devices of the one or more second participants; and transmitting the second content for display in the first area and the third content for display in the second area on the devices of the one or more second participants.

In another form, an apparatus is provided comprising: a memory; a network interface configured to enable network communication; and a processor, wherein the processor is configured to perform operations comprising: obtaining shared content during an online meeting, the shared content being shared by a first participant in the online meeting for display on devices of one or more second participants in the online meeting; detecting a visual object in the shared content; obtaining additional content based on detecting the visual object; and transmitting the additional content with the shared content for display on the devices of the one or more second participants.

In yet another form, one or more non-transitory computer readable storage media are provided that are encoded with instructions that, when executed by a processor, cause the processor to execute a method comprising: obtaining shared content during an online meeting, the shared content being shared by a first participant in the online meeting for display on devices of one or more second participants in the online meeting; detecting a visual object in the shared content; obtaining additional content based on detecting the visual object; and transmitting the additional content with the shared content for display on the devices of the one or more second participants.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
    obtaining shared content during an online meeting, the shared content being shared by a first participant in the online meeting for display on devices of one or more second participants in the online meeting;
    detecting a visual object in the shared content;
    obtaining additional content based on detecting the visual object;
    replacing an area of the shared content with the additional content; and
    transmitting the additional content with the shared content for displaying the shared content and the additional content in the area of the shared content on the devices of the one or more second participants.

2. The computer-implemented method of claim 1, wherein the shared content is associated with a first application and the additional content is associated with a second application.

3. The computer-implemented method of claim 1, wherein obtaining the additional content comprises:
    detecting information associated with the additional content in the shared content; and
    obtaining the additional content based on the information.

4. The computer-implemented method of claim 3, wherein obtaining the additional content includes transmitting a request to a second participant of the one or more second participants to share the additional content.

5. The computer-implemented method of claim 1, wherein the visual object includes a photographic image of a second participant in the online meeting and the additional content includes a video feed of the second participant.

6. The computer-implemented method of claim 1, wherein the additional content includes additional shared content, the additional shared content being shared by a second participant of the one or more second participants.

7. The computer-implemented method of claim 1, wherein the visual object is associated with a particular application and wherein obtaining the additional content includes launching the particular application to obtain the additional content.

8. The computer-implemented method of claim 1, wherein detecting the visual object comprises analyzing the shared content using an artificial intelligence process that is trained to recognize the visual object.

9. The computer-implemented method of claim 1, wherein the visual object includes a quick response (QR) code that includes information associated with the additional content.

10. The computer-implemented method of claim 1, further comprising replacing the visual object with the additional content in the shared content.

11. The computer-implemented method of claim 1, further comprising:
   detecting, in the shared content, a second visual object associated with second content and a third visual object associated with third content, the second visual object indicating that the second content is to be displayed in a first area on the devices of the one or more second participants, and the third visual object indicating that the third content is to be displayed in a second area on the devices of the one or more second participants; and
   transmitting the second content for display in the first area and the third content for display in the second area on the devices of the one or more second participants.

12. An apparatus comprising:
   a memory;
   a network interface configured to enable network communication; and
   a processor, wherein the processor is configured to perform operations comprising:
      obtaining shared content during an online meeting, the shared content being shared by a first participant in the online meeting for display on devices of one or more second participants in the online meeting;
      detecting a visual object in the shared content;
      obtaining additional content based on detecting the visual object;
      replacing an area of the shared content with the additional content; and
      transmitting the additional content with the shared content for displaying the shared content and the additional content in the area of the shared content on the devices of the one or more second participants.

13. The apparatus of claim 12, wherein, when obtaining the additional content, the processor is further configured to perform operations comprising:
   detecting information associated with the additional content in the shared content; and
   obtaining the additional content based on the information.

14. The apparatus of claim 12, wherein the visual object includes a photographic image of a second participant in the online meeting and the additional content includes a video feed of the second participant.

15. The apparatus of claim 12, wherein the additional content includes additional shared content, the additional shared content being shared by a second participant of the one or more second participants.

16. The apparatus of claim 12, wherein, when detecting the visual object, the processor is further configured to perform operations comprising:
   analyzing the shared content using an artificial intelligence process that is trained to recognize the visual object.

17. One or more non-transitory computer readable storage media encoded with instructions that, when executed by a processor, cause the processor to execute a method comprising:
   obtaining shared content during an online meeting, the shared content being shared by a first participant in the online meeting for display on devices of one or more second participants in the online meeting;
   detecting a visual object in the shared content;
   obtaining additional content based on detecting the visual object;
   replacing an area of the shared content with the additional content; and
   transmitting the additional content with the shared content for displaying the shared content and the additional content in the area of the shared content on the devices of the one or more second participants.

18. The one or more non-transitory computer readable storage media of claim 17, wherein obtaining the shared content further comprises:
   detecting information associated with the additional content in the shared content; and
   obtaining the additional content based on the information.

19. The one or more non-transitory computer readable storage media of claim 17, wherein the visual object includes a photographic image of a second participant in the online meeting and the additional content includes a video feed of the second participant.

20. The one or more non-transitory computer readable storage media of claim 17, wherein the additional content includes additional shared content, the additional shared content being shared by a second participant of the one or more second participants.

* * * * *